United States Patent [19]

Schnell

[11] 4,192,192
[45] Mar. 11, 1980

[54] DIAPHRAGM SEAL ASSEMBLY
[75] Inventor: Werner J. Schnell, Niles, Ill.
[73] Assignee: General Signal Corporation, Stamford, Conn.
[21] Appl. No.: 957,372
[22] Filed: Nov. 2, 1978
[51] Int. Cl.² ............................................... G01L 7/08
[52] U.S. Cl. ........................................ 73/715; 73/706; 92/98 R
[58] Field of Search ............................ 220/89 A, 89 B; 257/335 A; 73/715, 716, 717, 718, 719–728, 706; 92/102, 98 R

[56] References Cited
U.S. PATENT DOCUMENTS

| | | | |
|---|---|---|---|
| 1,640,606 | 8/1927 | Joyce | 92/98 R |
| 2,525,095 | 10/1950 | Coxon et al. | 73/725 |
| 2,649,332 | 8/1953 | Rappl | 92/98 R |

Primary Examiner—Donald O Woodiel
Attorney, Agent, or Firm—Jeffery S. Mednick

[57] ABSTRACT

A diaphragm seal assembly for use with a fluid pressure responsive instrument includes an upper housing member having a first inner side. This inner side has a recessed surface defining a cavity and includes a passageway extending through the upper member for connection with the fluid pressure responsive instrument. A lower housing member has a second inner side and a passageway extending through the lower housing member. A diaphragm is received in the cavity and is clamped between the upper and lower housing members. A clamping device is provided for securing the upper and lower housing members together. The improvement comprises a deformable lip structure extending from the first inner side for bending over the periphery of the diaphragm to sealingly secure the diaphragm to the upper housing member.

10 Claims, 4 Drawing Figures

DIAPHRAGM SEAL ASSEMBLY

BACKGROUND OF THE INVENTION

The present invention relates generally to fluid pressure indicating instruments and more particularly to pressure gauges for measuring the pressure of fluids which, if used in ordinary type gauges, would be injurious to the reliable operation of the working parts of the instrument.

In using instruments such as, for example, pressure gauges, indicators, pressure transmitters and the like, it is often desirable to isolate the instrument from over pressure, corrosion, freezing, or the plugging of the instrument by sediment or the like suspended in or carried by the pressurized fluid. In the past, guard devices of the kind wherein a pressure sensitive diaphragm is interposed between the source of pressure and a liquid for transmitting motion from the diaphragm to the pressure responsive element of the instrument have been used to overcome the above mentioned problems. U.S. Pat. No. 3,202,063 to Bissell et al discloses, for example, "a guard device such that the pressure instrument may be disconnected from the top member of the casing while the diaphragm is exposed to the source of pressure..." Also, U.S. Pat. No. 2,568,238 to LeVan discloses, for example, "A fluid pressure-indicating instrument of the kind mentioned wherein the edge of the metal diaphragm is soldered to a seat formed on the removable structural unit, and is also forcibly held on that seat independently of the soldering by clamping means when the instrument is assembled."

When a seal assembly is used in conjuction with a gauge that is fluid filled, the fluid has to be carefully inserted into the gauge after the seal assembly has been attached to the inlet of the gauge. This care is required in order that no air bubbles will be present in the liquid to cause inaccuracies in the functioning of the gauge. Therefore, it is important that the diaphragm be carefully sealed in the seal assembly before the oil is placed into the gauge and the adjoining seal assembly. In the past, two general sealing techniques have been used in the assemblies. Either the diaphragm was loosely placed between two members of the seal assembly and clamped between the members to sealingly engage the edges of the diaphragm or the diaphragm was soldered onto the portion of the assembly which was connected to the gauge. In the latter case, which is illustrated and described in the aforementioned patents, there is an advantage in that the portion of the assembly attached to the gauge may be removed for cleaning the diaphragm, and the like, without losing the fluid in the gauge. However, soldering or welding the diaphragm onto the assembly causes problems such as stressing and thereby weakening the diaphragm which is generally very thin, being restricted to a diaphragm having a metal outer periphery capable of being welded or soldered, forming a permanent assembly which is difficult to repair, and requiring a relatively complicated manufacturing procedure which may be expensive. It has been known to clamp a diaphragm into a housing by a flange as illustrated in U.S. Pat. No. 2,220,902 to Hastings et al but there is no teaching of clamping a diaphragm in an environment as provided in the present invention.

SUMMARY OF THE INVENTION

Accordingly, a diaphragm seal assembly has been provided to overcome these problems. It includes an upper housing member having a first inner side on which a recessed surface defines a cavity. A passageway extends through the upper housing member for connection with the fluid responsive instrument. A lower housing member has a second inner side and a passageway extending through the lower housing member. A diaphragm is received in the cavity and is clamped between the upper and lower housing members. A clamping device secures the upper and lower housing members together. The improvement comprises a deformable lip structure extending between the first inner side for bending over the periphery of the diaphragm to sealingly secure the diaphragm to the upper housing member.

OBJECTS OF THE INVENTION

It is an object of the present invention to provide a diaphragm seal assembly which is suited for measuring pressure of injurious fluids.

It is a further object of the present invention to provide a diaphragm seal assembly which allows the pressure instrument to be disconnected from the source of pressure without losing the fluid fill within the instrument.

It is a still further object of the present invention to provide a diaphragm seal assembly which incorporates a diaphragm of any desired material.

It is an additional object of the present invention to provide a diaphragm seal assembly which is easily disassembled to repair the diaphragm.

It is a further object of the present invention to provide a diaphragm seal assembly which is relatively leak proof.

It is a still further object of the present invention to provide a diaphragm seal assembly which is relatively simple to construct and therefore inexpensive to manufacture.

Other objects, advantages and novel features of the present invention will become apparent from the following detailed description of the invention when considered in conjunction with the accompanying drawings.

DESCRIPTION OF THE PREFERRED EMBODIMENT

Figure 1:
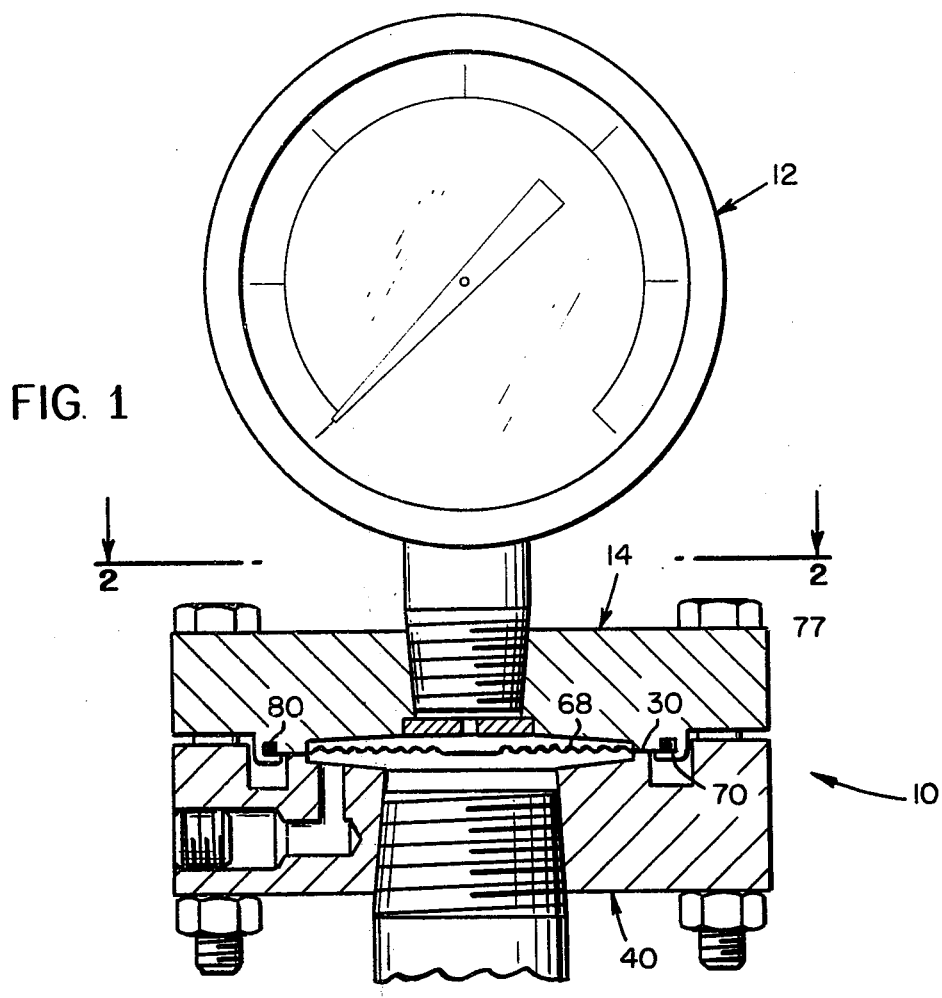
FIG. 1 is a cross-sectional view of a diaphragm seal assembly connected to a fluid pressure responsive instrument in accordance with the present invention.

In accordance with the present invention, a diaphragm seal assembly 10 may be used with a fluid pressure responsive instrument 12. The assembly 10 includes an upper housing member 14 having a first inner side 16 on which a recessed surface 18 defines a cavity and a passageway 20 extends through the upper member for connection with the fluid pressure responsive instrument 12. A lower housing member 40 has a second inner side 42 and a passageway 46 extending through the lower housing member. A diaphragm 68 is received in the cavity and may be clamped between the upper and lower housing members 14 and 40 respectively. A clamping device 75 secures the upper and lower housing members together. The improvement comprises deformable lip structure 22 extending from the first inner side 16 and being bent over the periphery 70 of the diaphragm to sealingly secure the diaphragm 68 to the upper housing member 14.

Figure 3:
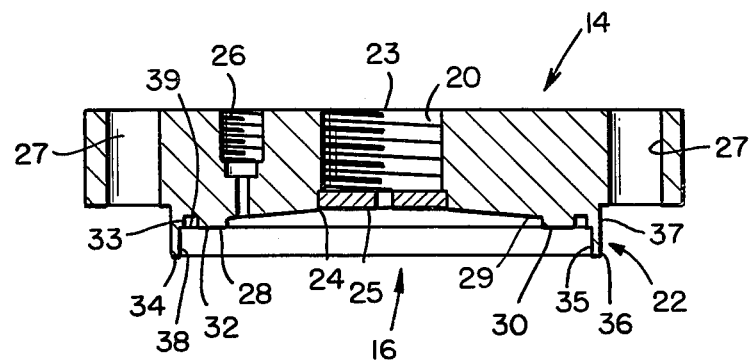
FIG. 3 is a cross-sectional view of an upper housing member and a diaphragm attached thereto.

Referring to FIG. 1, there is illustrated a diaphragm seal assembly 10 connected to a fluid pressure responsive instrument 12. The upper housing member 14, as best seen in FIG. 3, has an inner side 16. A recessed surface 18 is a shallow, downwardly tapering, conical, axial cavity whose inner edge merges with a cylindrical, internally screw threaded bore 20. The passageway or bore 20 includes an inlet 23 and an outlet 24. A backup element 25 is provided in the bore outlet for supporting the diaphragm 68 and preventing rupture thereof. A passageway 26 is used in filling the seal assembly and the pressure responsive instrument with any desired fluid in any conventional manner. Any desired number of bolt bores 32 are provided for receiving clamping bolts 77.

Figure 2:
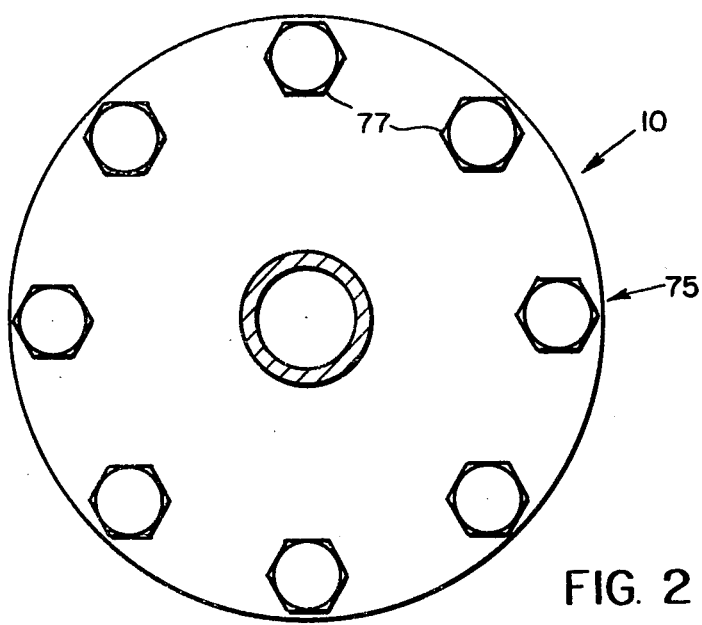
FIG. 2 is a view through 2—2 of FIG. 1.

Referring more specifically to the first inner side 16, an annular housing wall 28 is adjacent the periphery 29 of the recessed surface 18 and includes a first portion 30 which does not underlie the lip structure 22, see FIG. 1. A second portion 32 of the housing wall 28 supports the lip structure 22 as will be explained and is adjacent to a groove 33 which is provided to receive a seal ring 80 as will be further explained. The deformable lip structure 22 includes a protrusion 34 having annular inner and outer walls 35 and 36 respectively. The annular protrusion 34 includes a base section 37 having a greater width than an upper section 38. The base section is joined to the upper section at an edge 39. The upper housing member 14 is generally circular in shape, as best seen in FIG. 2, but may be of any desired shape.

Figure 4:
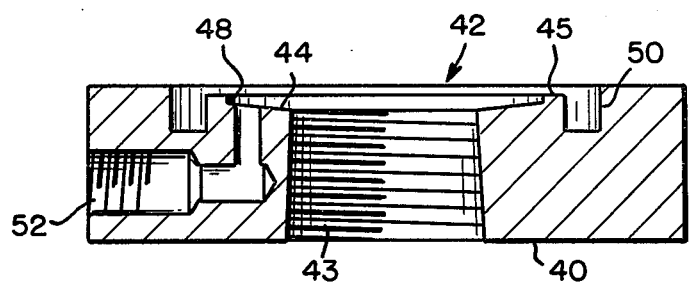
FIG. 4 is a cross-sectional view of a lower housing member.

A lower housing member 40, as best seen in FIG. 4, has a second inner side 42 and a passageway 43 which may be a threaded bore co-axially extending through the housing member. A recessed surface 44 which is a shallow, downwardly tapering, conical, axial cavity substantially the same as surface 18, has a smaller end merging with the bore 43. An annular housing wall 45 is adjacent the periphery of the recessed surface 44 and is joined thereto along an edge 48. An annular groove 50 is adjacent to the wall 45 and is sized to receive the lip structure 22 when it is bent over the diaphragm as illustrated in FIG. 1. A port 52 is provided for flushing the lower housing member in a conventional manner. The lower housing member 40 includes bolt bores (not shown) corresponding to the bolt bores 27 in the upper housing member for clamping the upper and lower housing members together. The member 40 is generally circular in shape, but it is within the scope of the invention to make it of any desired shape.

A circular diaphragm 68 having an outer periphery 70, see FIG. 1, is sealingly secured to the upper housing member. The diaphragm may be made of any desired material such as, for example, steel and coated with teflon or any other desired coating as required. Beneath the diaphragm is a seal ring 80 which may be made of any desired elastomer such as, for example, Nitrile. The seal ring 80 acts with the diaphragm to provide a positive seal when the lip structure is bent over the diaphragm. The diaphragm, housing members, cavities, grooves, walls and lip structure are illustrated as annular, however, it is within the scope of the invention to form them in any desired shape with the limitation that the assembly maintains a fluid tight seal.

In assembling the diaphragm seal of the present invention, diaphragm 68 is placed on the upper housing member 14 against the housing wall 28. The periphery 70 of the diaphragm sits on the edge 39 of the base section 37 of the protrusion 34. The upper section 38 is then bent over in order that the periphery of the diaphragm is clamped against the inner wall 35 and the housing wall 28 of the first inner side 16. When the upper section 38 is bent along the edge 39, the inner wall 35 is facing a second portion 32 of the housing wall 28. Next, the upper housing member 14 and the lower housing member 40 are joined together so that the housing wall 28 and the housing wall 45 are aligned with each other and receive the diaphragm between them to form a seal when the upper and lower housing members are clamped together. The diaphragm is then able to move between the cavities formed by the recessed surfaces 18 and 44. The deformable lip structure 22 is received within the annular groove 50 so that the upper and lower housing members may be tightly joined together to create the seal between the housing walls 28 and 45. The clamping bolts 77 are then inserted and tightened. Finally, a fluid pressure responsive instrument 12 such as, for example, a case including a standard Bourdon tube gauge is joined to the upper passageway 20 and filled with fluid. The fluid is then present in the diaphragm seal assembly above the diaphragm 68.

Once the gauge and seal assembly are filled with fluid, it is important that the fluid remains sealed therein because any leakage will alter the accuracy of the gauge. Thus, one of the advantages of the present invention is that the lip structure 22 along with the seal ring 80 maintains a fluid tight seal in the event that the upper housing member 14 is removed from the lower housing member 40. Therefore, by removing the clamping bolts 77, the diaphragm seal assembly may be disassembled for purposes of cleaning the exposed surface of the diaphragm 68 as required.

To expand a Bourdon tube (not shown) in gauge 12 from no pressure indication to full pressure indication, only a very small amount of fluid need be forced into the Bourdon tube. In the case of the present invention, it is the movement of the diaphragm 68 which forces into, or releases from, the Bourdon tube said additional amounts of liquid. This amount of liquid is small and the movement of the diaphragm required for achieving the maximum movement of the Bourdon tube need likewise be small. Thus, a diaphragm of small area may be used and this, in turn, permits small dimensions of the diaphragm seal assembly.

When the diaphragm 68 moves due to fluid in the passageway 43 of the lower housing member, it causes the fluid located above the diaphragm 68 in the upper housing member and in the gauge to also move. Therefore, the diaphragm has a primary function of providing a flexible separating wall. It follows that the flexure characteristics of the diaphragm material may not be significant. Thereforem a diaphragm of any desired size without any special spring characteristics may be sufficient for the proper operation of the pressure responsive instrument.

The fluid pressure to be measured never reaches the instrument 12 and the fluid does not impair the operation of the gauge. Thus, whether the fluid in the passageway 43 is a corrosive gas or liquid, or a liquid of high viscosity that would not readily move through a narrow cross section in the gauge or a liquid containing sediment that could clog up the pressure responsive instrument, the action of the gauge will not be affected. Instead, only the fluid located in the gauge and upper housing member enters the gauge and therefore accurate readings are maintained.

An additional feature in the present invention is protection in case of rupture of the diaphragm. Even if the seal between the walls 28 and 45 become faulty, the fluid would have to pass between a tortuous path between the deformable lip structure 22 and the housing wall 45. Thus, the fluid would not be able to spray out a long distance to cause possible damage but would rather leak out from between the upper and lower housing members.

Thus, a diaphragm seal assembly has been provided which is suitable for measuring pressure of injurious fluids. Also, the seal assembly allows a fluid pressure responsive instrument to be disconnected from the source of pressure without losing the liquid fill therein. The apparatus provides the incorporation of a diaphragm of any desired material and may be easily disassembled to repair the diaphragm if required. The seal assembly also includes blowout protection. The apparatus has a positive seal and is therefore relatively leak proof. The seal assembly of the present invention is relatively simple to construct and therefore relatively inexpensive to manufacture.

While there has been described what are at present considered to be the preferred embodiments of the present invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A diaphragm seal assembly for use with a fluid pressure responsive instrument including:
   an upper housing member having a first inner side, said first inner side having a recessed surface defining a cavity and having a pasageway extending through said upper member for connection with said fluid pressure responsive instrument,
   a lower housing member having a second inner side and a passageway extending through said lower housing member,
   a diaphragm received in said cavity and clamped between said upper and lower housing member,
   clamping means for securing said upper and lower housing members together, the improvement comprising;
   deformable lip means extending from said first inner side for bending over the periphery of said diaphragm to sealingly secure said diaphragm to said upper housing member, independent of the clamping means for securing the upper and lower members together.

2. The diaphragm seal assembly as defined in claim 1, further characterized in that said deformable lip means is a protrusion having an inner and outer wall, whereby the periphery of said diaphragm is clamped against said inner wall and said first inner side when said protrusion is bent over the periphery of said diaphragm.

3. The diaphragm seal assembly as defined in claim 2, further including cooperating wall means on said upper and lower housing members for sealing said diaphragm between said housing member.

4. The diaphragm seal assembly as defined in claim 3, further characterized in that said cooperating wall means comprises a first housing wall adjacent the periphery of said recessed surface of said upper housing member and a second housing wall on said second inner side, wherein said first and second housing walls are substantially aligned with one another to sealingly receive said diaphragm which is clamped between said upper and lower housing members.

5. The diaphragm seal assembly as defined in claim 4, further characterized in that said upper housing member has a first groove between the periphery of said first housing wall and the inner wall of said protrusion, and a seal alignment is provided in said first groove for engaging said diaphragm.

6. The diaphragm seal assembly as defined in claim 5, further characterized in that said first housing wall has a first portion adjacent said first cavity and a second portion adjacent said groove, said second portion supports said inner wall which is bent over against the diaphragm to seal the diaphragm between the second portion and the inner wall, and said second inner side has a second groove adjacent the outer periphery of said second housing wall for receiving the bent over deformable lip means when the upper and lower housing members are clamped together.

7. The diaphragm seal assembly as defined in claim 6, further characterized in that said protrusion, said diaphragm, said first and second housing walls, and said first and second grooves are substantially annular in shape.

8. The diaphragm seal assembly as defined in claim 7, wherein said seal element is a seal ring.

9. The diaphragm seal assembly as defined in claim 8, further characterized in that said second inner side has a recessed surface defining a second cavity substantially opposite the cavity in said upper housing member for receiving the diaphragm when the housing members are clamped together, and said passageways in said upper and lower housing members extend through said cavities.

10. The diaphragm seal assembly as defined in claim 9, wherein said fluid pressure responsive instrument is a pressure gauge connected to said passageway in said upper housing member.

* * * * *